(12) United States Patent
Hamamoto

(10) Patent No.: US 6,311,653 B1
(45) Date of Patent: Nov. 6, 2001

(54) INTERNAL COMBUSTION ENGINE

(75) Inventor: Takayuki Hamamoto, Yokohama (JP)

(73) Assignee: Nissan Motor Co., Ltd., Yokohama (JP)

(*) Notice: Subject to any disclaimer, the term of this patent is extended or adjusted under 35 U.S.C. 154(b) by 0 days.

(21) Appl. No.: 09/598,834

(22) Filed: Jun. 21, 2000

(30) Foreign Application Priority Data

Jun. 25, 1999 (JP) .................................................. 11-180453

(51) Int. Cl.[7] .................................. F01L 9/04; F02B 27/00
(52) U.S. Cl. ...................................... 123/90.11; 123/90.15; 123/306; 123/308; 123/432
(58) Field of Search ............................. 123/90.11, 90.15, 123/90.16, 90.17, 306, 308, 432

(56) References Cited

U.S. PATENT DOCUMENTS

| | | | |
|---|---|---|---|
| 4,829,947 | * 5/1989 | Lequesne | 123/90.11 |
| 5,216,987 | 6/1993 | Clarke | 123/90.11 |
| 5,494,007 | * 2/1996 | Schroeder et al. | 123/90.11 |
| 5,669,341 | 9/1997 | Ushirono et al. | 123/90.11 |
| 6,182,621 | 2/2001 | Salber et al. | 123/90.15 |

FOREIGN PATENT DOCUMENTS

| | | |
|---|---|---|
| 197 33 139 | 2/1999 | (DE) . |
| 0 854 280 | 7/1998 | (EP) . |
| 5-157008 | 6/1993 | (JP) . |

* cited by examiner

Primary Examiner—Weilun Lo
(74) Attorney, Agent, or Firm—Foley & Lardner

(57) ABSTRACT

An internal combustion engine comprises intake and exhaust valves. An electromagnetic actuator is provided for actuating each intake valve so that the intake valve makes its opening and closing action. A control unit is provided for controlling the electromagnetic actuator in accordance with engine operating conditions. The control unit is arranged to control the electromagnetic actuator in a manner to cause the intake valve to make first and second opening and closing actions in an intake stroke in synchronism with intake air pulsation. The first opening and closing action is before in time the second opening and closing action.

6 Claims, 9 Drawing Sheets

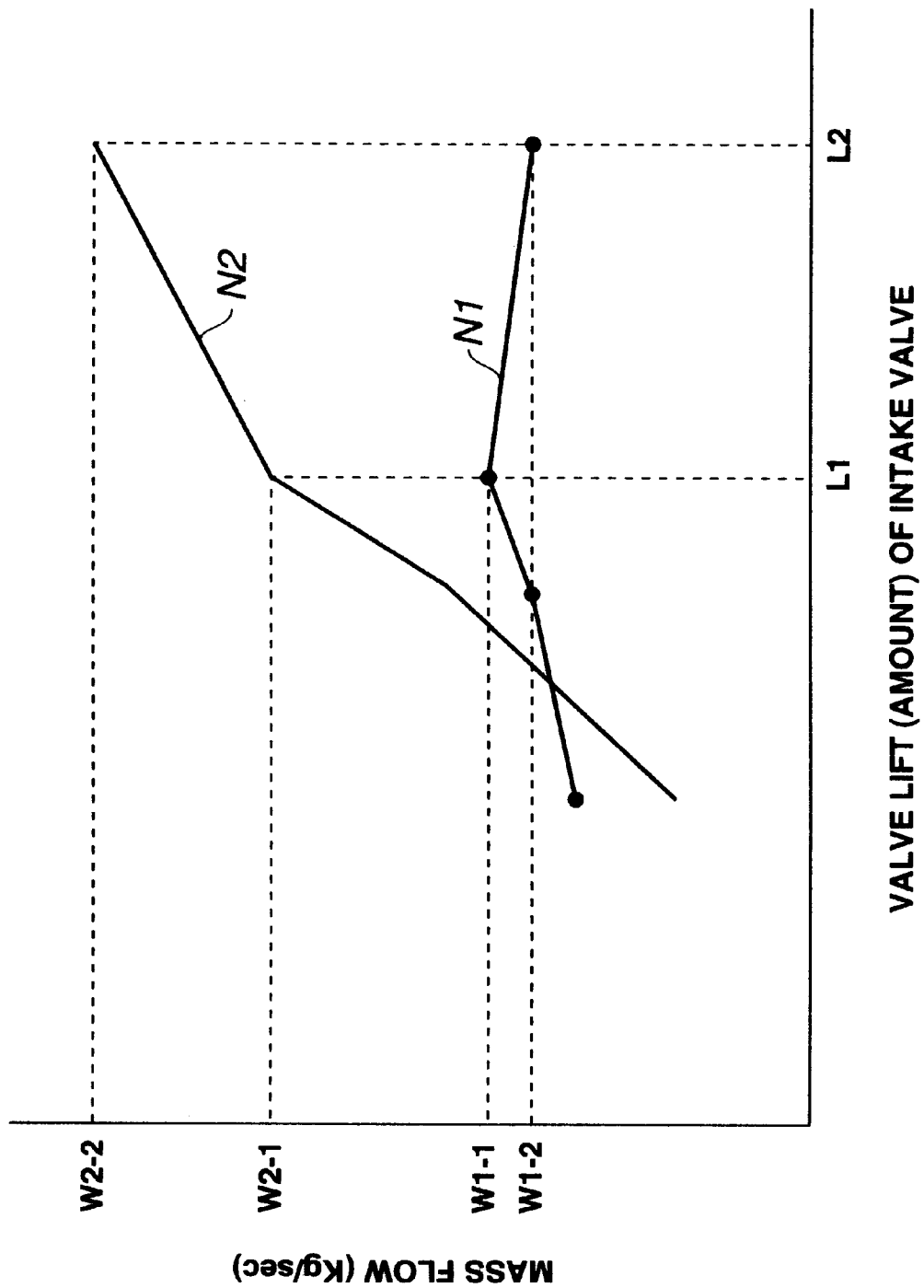

US 6,311,653 B1

INTERNAL COMBUSTION ENGINE

BACKGROUND OF THE INVENTION

This invention relates to improvements in an internal combustion engine, and more particularly to improvements in an internal combustion engine of the type wherein intake valves are electromagnetically operated.

Hitherto an internal combustion engine of the type wherein an engine valve is operated to make its opening and closing action twice in one engine cycle has been disclosed in Japanese Patent Provisional Publication No. 5-157008. The engine is provided with a storage chamber communicable with a combustion chamber or engine cylinder. The engine valve or storage chamber valve is movably disposed between the storage chamber and the combustion chamber. The storage chamber valve makes its first opening and closing action in expansion stroke thereby temporarily storing combustion or burnt gas into the storage chamber. Thereafter, the storage chamber valve makes its second opening and closing action in compression stroke thereby returning or recirculating cooled burnt gas back into the combustion chamber.

SUMMARY OF THE INVENTION

However, the above conventional engine requires a port for the storage chamber and the storage chamber valve in addition to intake and exhaust ports and intake and exhaust valves. Further, the storage chamber valve requires a valve operating mechanism therefore. This complicates the structure of the engine, making the engine large-sized and complicating the shape of the combustion chamber.

In general, on a combustion chamber wall, the area for intake and exhaust valves (ports) is limited. Accordingly, in case of providing the port for the storage chamber, the area for the intake and exhaust valves (ports) is reduced upon addition of the storage chamber valve.

Furthermore, in the above conventional engine, operation of the intake and exhaust valves and the storage chamber valve is not electromagnetically controlled, and therefore the opening and closing action of the storage chamber valve cannot be made twice in one stroke of the engine cycle thereby making it impossible to appropriately control intake air. Consequently, it is required to provide other systems such as an intake air control system which is adapted to change the length and volume of an intake manifold, for example, in accordance with load conditions of the engine. This will unavoidably make the engine and peripheral devices large-sized.

It is an object of the present invention to provide an improved internal combustion engine which can effectively overcome drawbacks encountered in conventional internal combustion engines of the similar natures.

Another object of the present invention is provide an improved internal combustion engine which can largely improve a volumetric efficiency of the engine without making the engine complicated and large-sized.

An internal combustion engine of the present invention comprises an intake valve. An electromagnetic actuator is provided for actuating the intake valve so that the intake valve makes its opening and closing action. A control unit is provided for controlling the electromagnetic actuator in accordance with engine operating conditions. The control unit is arranged to control the electromagnetic actuator in a manner to cause the intake valve to make first and second opening and closing actions in an intake stroke in synchronism with intake air pulsation. The first opening and closing action is before in time the second opening and closing action.

BRIEF DESCRIPTION OF THE DRAWINGS

FIG. 5 is a graph showing the relationship between mass flow ratio and valve lift (amount) of intake valve, explaining a valve lift sensitivity of the intake valve of a second embodiment of the internal combustion engine according to the present invention;

DETAILED DESCRIPTION OF THE INVENTION

Figure 1:
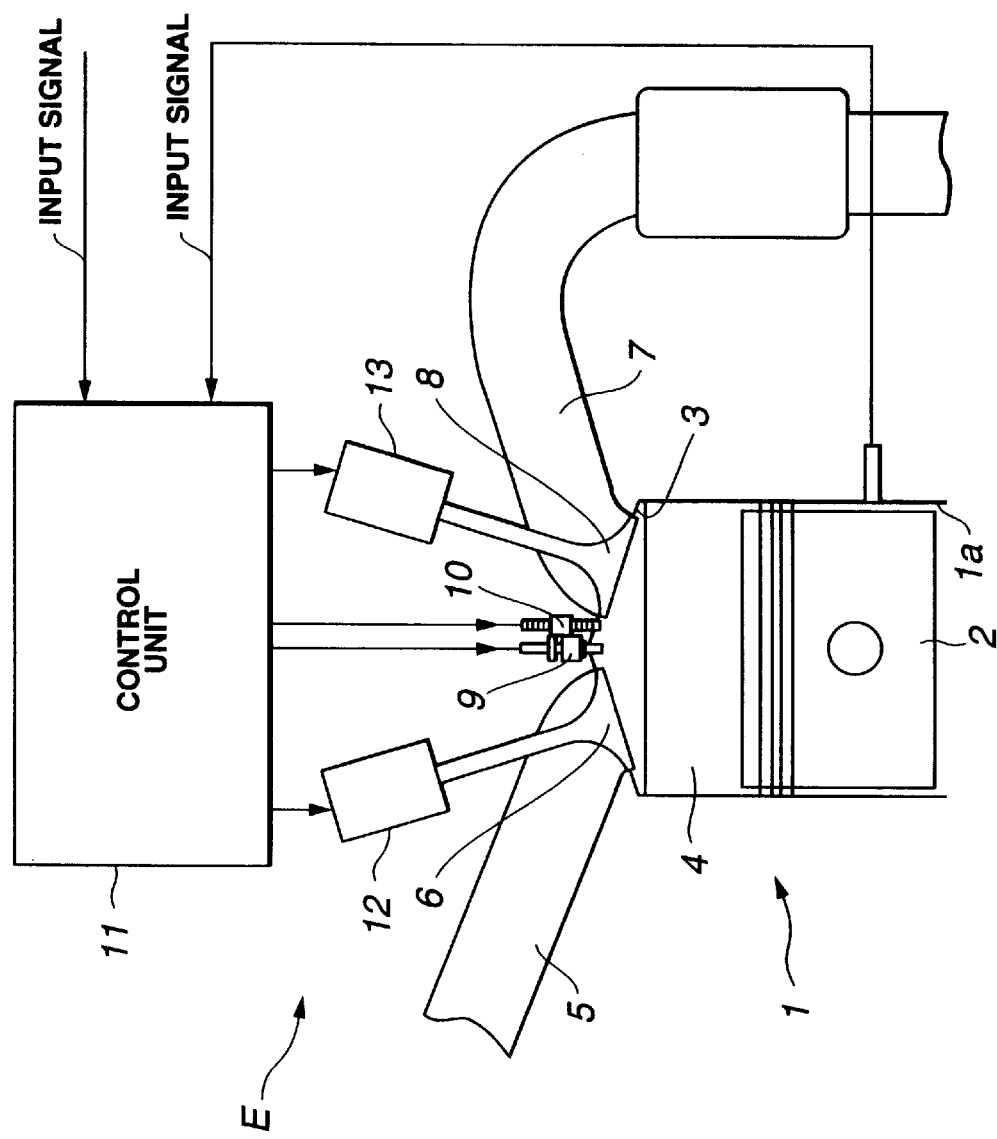
FIG. 1 is a schematic illustration of a first embodiment of an internal combustion engine according to the present invention.

Referring now to FIG. 1 of the drawings, a first embodiment of an internal combustion engine according to the present invention is illustrated by the reference character E. The engine E of this embodiment is for an automotive vehicle (not shown). The engine E comprises a cylinder block 1 which is formed with a plurality of cylinders 1a though only one cylinder 1a is shown. A piston 2 is disposed in each cylinder 1a to be movable in a reciprocating manner. A cylinder head 3 is fixedly disposed on the cylinder block to close the upper part of each cylinder 1a. A combustion chamber 4 is defined in the cylinder 1a and between the piston 2 and the cylinder head 3.

The cylinder head 3 is formed with an intake port 5 and an exhaust port 7 for each combustion chamber 4 or each cylinder 1a. The intake port 5 has an end portion which is opened to the combustion chamber 4. The exhaust port 7 has an end portion which is opened to the combustion chamber 4. An intake valve 6 is axially movably disposed to the cylinder head 3 to open or close the end portion of the intake port 5. The end portion of the intake port 5 is closed when the intake valve 6 is closed, while is opened to allow intake air to flow into the combustion chamber 4 when the intake valve 6 is opened. An exhaust valve 8 is axially movably disposed to the cylinder head 3 so as to open or close the end portion of the exhaust port 7. The end portion of the exhaust port 7 is closed when the exhaust valve 8 is closed, while is opened to allow exhaust gas to be discharged through the exhaust port 7 when the exhaust valve 8 is opened.

A fuel injector valve 9 is fixedly disposed to the cylinder head 3 to inject fuel into the combustion chamber 4 so as to form an air-fuel mixture in the combustion chamber 4 upon being mixed with intake air flown through the intake port 5 into the combustion chamber 4. A spark plug 10 is fixedly disposed to the cylinder head 3 in such a manner that its tip end projects into the combustion chamber 4 so as to ignite the air-fuel mixture within the combustion chamber 4. With such an arrangement, fuel such as gasoline or the like is injected from the fuel injector valve 9 to form the air-fuel mixture within the combustion chamber 4. The thus formed air-fuel mixture is pressurized by the rising piston 2 in compression stroke so as to obtain a high pressure and temperature air-fuel mixture. This air-fuel mixture is ignited by the spark plug 10 and burnt in the combustion chamber 4.

The intake and exhaust valves 6, 8 are drivably connected respectively to electromagnetic actuators 12, 13 and electromagnetically driven or actuated respectively by the electromagnetic actuators 12, 13 so as to be upward and downward moved. The intake valve 6 is closed to close the intake port 5 upon being moved upward while is opened to open the intake port 5 upon being moved downward. The exhaust valve 8 is closed to close the exhaust port 7 upon being moved upward while is opened to open the exhaust port 7 upon being moved downward.

The electromagnetic actuators 12, 13 are electrically and controllably connected to an engine control unit 11 and arranged to be independently moved upward or downward at certain timings in accordance with control signals fed from the engine control unit 11. The engine control unit 11 is supplied with a variety of input signals representative of operating conditions of the engine E, from the inside and outside of the engine E. Examples of the input signals are an engine speed signal representative of engine speed of the engine E, an engine load signal representative of engine load of the engine E, an engine oil temperature signal representative of temperature of engine oil, an engine coolant temperature signal representative of temperature of an engine coolant, an intake air amount signal representative of an amount of the intake air, an air-fuel ratio signal representative of an air-fuel ratio of the air-fuel mixture to be formed within the combustion chamber 4. The engine control unit 11 is arranged or programmed to carry out a processing operation in accordance with the above signals, thereby determining a fuel injection timing at which fuel is injected from the fuel injector valve 9, a fuel injection amount in which fuel is injected through the fuel injector valve 9, a spark timing at which the spark plug 10 produces a spark to ignite the air-fuel mixture, and controlling operation of the electromagnetic actuators 12, 13.

Figure 2:
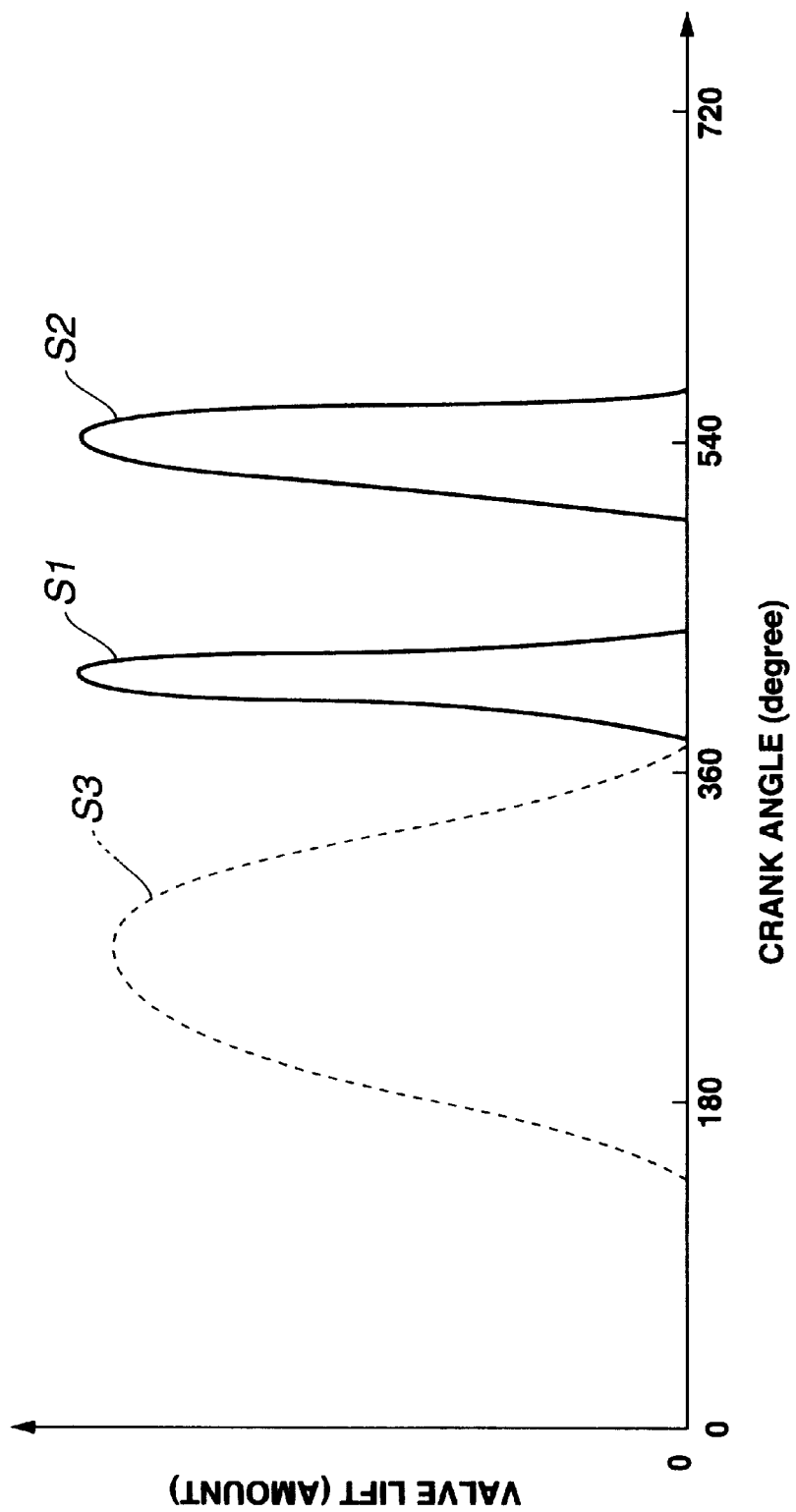
FIG. 2 is a graph showing the relationship between valve lift (amount) and crankangle (degree), explaining an operational manner of intake valves of the engine of FIG. 1.

Under the processing operation of the engine control unit 11, the electromagnetic actuators 12, 13 are controlled to operate the intake and exhaust valves 6, 8 of the engine E in such a manner as shown in FIG. 2 which depicts the relationship between valve lift (amount) and an operational cycle or crankangle of the engine in this embodiment. In FIG. 2, a solid curve indicates the valve timings of the intake valve 6, while a broken curve indicates the valve timings of the exhaust valve 8.

As depicted in FIG. 2, in this embodiment, an opening and closing action of the intake valve 6 is made twice in an intake stroke of the engine E. In other words, first and second opening and closing actions (or first and second air intakes) of the intake valve 6 is made in the intake stroke. In FIG. 2, a solid curve S1 indicates the first opening and closing action, while a solid curve S2 indicates the second opening and closing action; and a broken curve S3 indicates an opening and closing action of the exhaust valve 8.

Specifically, the first opening (forming part of the first opening and closing action) of the intake valve 6 is initiated after the closing of the exhaust valve 8 and at the initial period of the intake stroke. The first opening of the intake valve 6 is maintained throughout a duration (first opening duration) of 60° in crankangle. Then, the first closing (forming part of the first opening and closing action) of the intake valve 6 is completed. Thereafter, the second opening (forming part of the second opening and closing action) of the intake valve 6 is initiated at a timing which is 60° in crankangle after the completion of the first closing of the intake valve 6. The second opening of the intake valve 6 is maintained throughout a duration (first opening duration) of 90° in crankangle. Then, the second closing (forming part of the second opening and closing action) of the intake valve 6 is completed.

Figure 3:
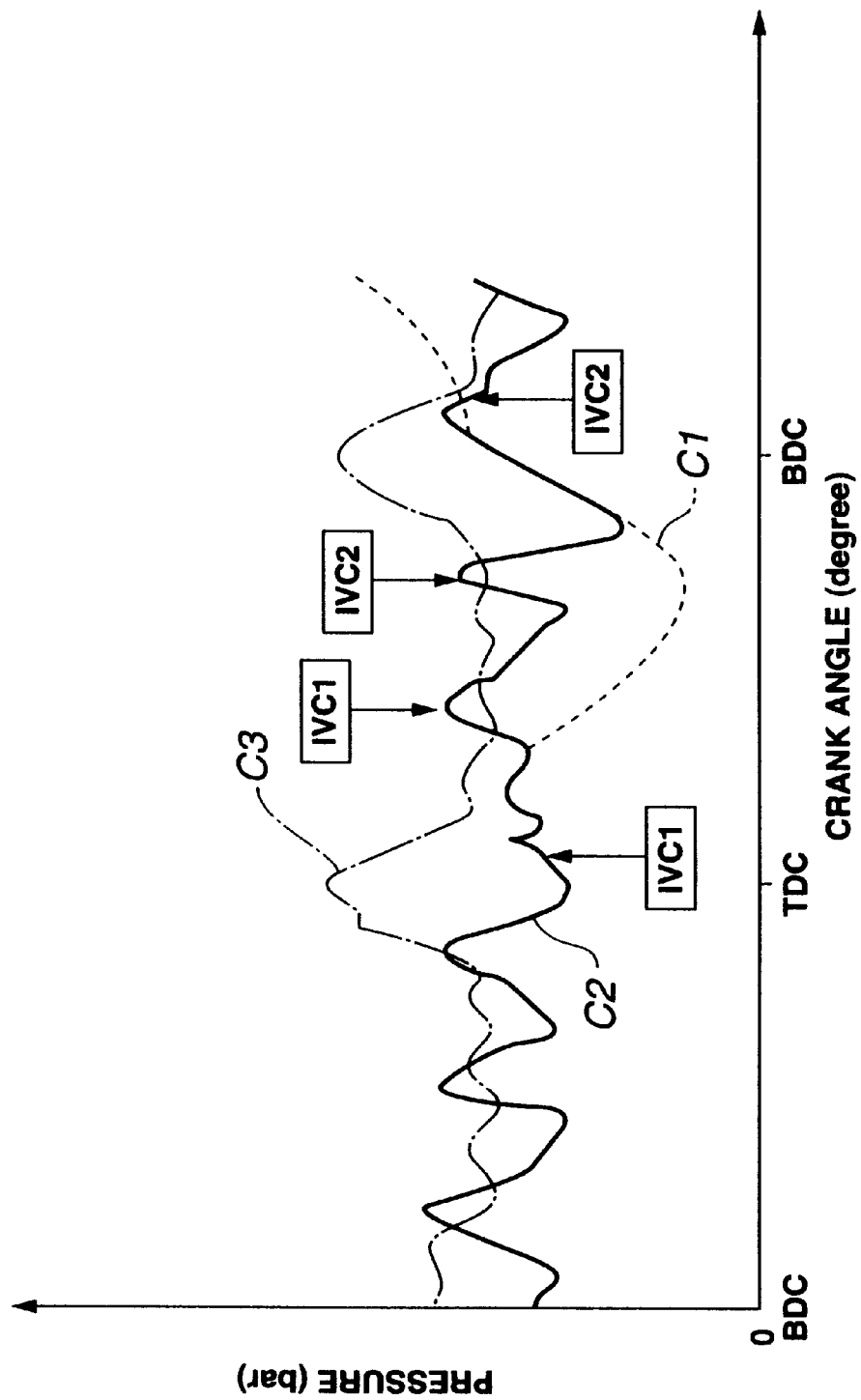
FIG. 3 is a graph showing the relationship between pressure (bar) and crankangle (degree), explaining intake air pulsation in the engine of FIG. 1.

In other words, the first opening of the intake valve 6 is made in timed relation to the initiation of the intake stroke as conventional, and the first closing of the intake valve 6 is made in synchronism with (in timed relation to) intake air pulsation in the intake port 5. The second opening and closing action of the intake valve 6 are also made in synchronism with the intake air pulsation. In this connection, FIG. 3 depicts variations in in-cylinder pressure (pressure inside the combustion chamber or cylinder), intake air pressure (pressure of intake air outside the combustion chamber) and exhaust gas pressure (pressure of exhaust gas outside the combustion chamber 4). The in-cylinder pressure is indicated by a curve C1; the intake air pressure is indicated by a curve C2; and the exhaust gas pressure is indicated by a curve C3. In FIG. 3, "IVO1" and "IVC1" represent respectively the first opening and the first closing (in the first opening and closing action) of the intake valve 6; and "IVO2" and "IVC2" represent respectively the second opening and the second closing (in the second opening and closing action) of the intake valve 6.

As depicted in FIG. 3, the first opening of the intake valve 6 is initiated immediately after the top dead center (TDC), and the first closing of the intake valve 6 is completed or terminated at a timing (represented by "IVC1") at which the intake air pressure has reached to the highest level. Upon this first opening of the intake valve 6, gas within the intake port 5 is sucked into the combustion chamber 4 so that gas flow toward the combustion chamber 4 is generated. In synchronism with (in timed relation to) rise in intake air pressure due to generation of the gas flow, the first opening and closing action of the intake valve 6 is terminated, and therefore the gas flow within the intake port 5 is interrupted by closing the intake valve 6 so that the intake air pressure wave is reflected. This amplifies the intake air pulsation.

After the first opening and closing action of the intake valve 6 has been terminated, the intake air pressure is temporarily lowered under the action of wave motion of the intake air pressure wave, and then again starts to rise under the action of the intake air pulsation. Thereafter, the second opening of the intake valve 6 is initiated at a timing (represented by "IVO2") at which the difference in pressure between the inside and outside of the cylinder (combustion chamber) increases owing to lowering in the in-cylinder pressure upon downward movement of the piston 2. Then, the piston 2 reaches the bottom dead center (BDC), and the second closing of the intake valve 6 is terminated immediately before the in-cylinder pressure rises over the intake air pressure (or at a timing represented by "IVC2"). It will be understood that a duration in which the first and second opening and closing actions of the intake valve are made is not limited to a crankangle range of from 360° to 540°.

Figure 4:
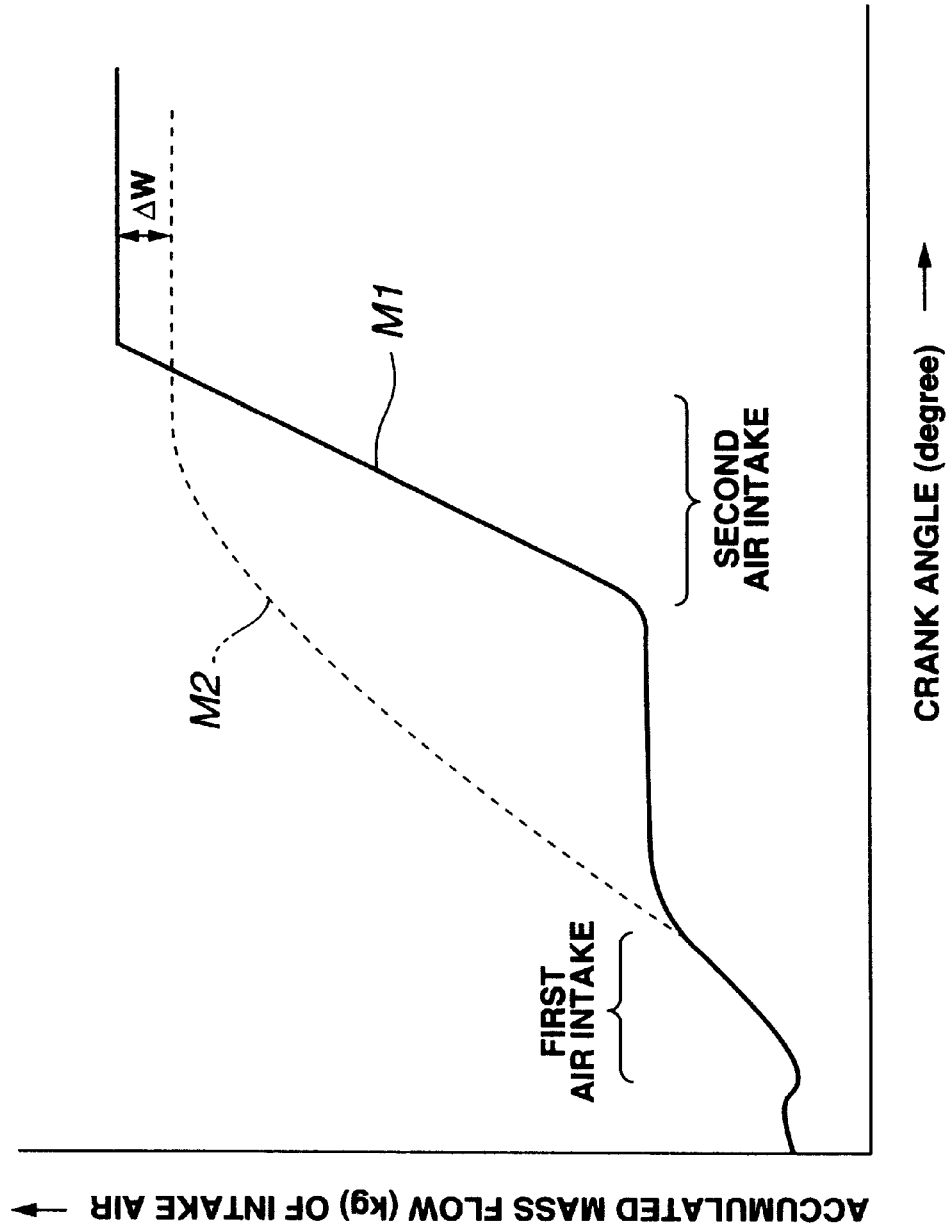
FIG. 4 is a graph showing the relationship between accumulated mass flow (kg) of intake air and crankangle (degree), explaining mass flow of intake air to be supplied into a combustion chamber in the engine of FIG. 1.

By virtue of the fact that air intake is made twice in an intake stroke, air intake to the cylinder can be effectively accomplished under the pressure differential between the inside and outside of the cylinder (combustion chamber). In this connection, FIG. 4 depicts a volumetric efficiency in terms of mass flow (kg) of intake air, in the intake stroke where two (first and second) air intakes are accomplished respectively by the first and second opening and closing actions of the intake valve. In FIG. 4, a curve M1 represents a variation in mass flow of the intake air in this embodiment of the present invention; and a curve M2 represents a variation in mass flow of the intake air in a conventional technique in which air intake is made only once in the intake stroke. As revealed in FIG. 4, in case that air intake is accomplished twice in the intake stroke, the intake air amount per unit time (i.e., an inclination of the curve of mass flow) is increased during the first air intake, so that the intake air amount increases by ΔW.

Next, a second embodiment of the internal combustion engine E according to the present invention will be discussed. The internal combustion engine E of this embodiment is the same in construction as that of the first embodiment but slightly different in control for the intake valve 6. Accordingly, the combustion chamber 4 is defined in the cylinder 1a and between the piston 2 and the cylinder head 3. The cylinder head 3 is provided with the intake and exhaust valves 6, 8 which are electromagnetically operated respectively by the actuators 12, 13. Additionally, the cylinder head 3 is provided with the fuel injector valve 9 and the spark plug 10. The actuators 12, 13, the fuel injector valve 9 and the spark plug 10 are controlled by the engine control unit 11.

Figure 10A:
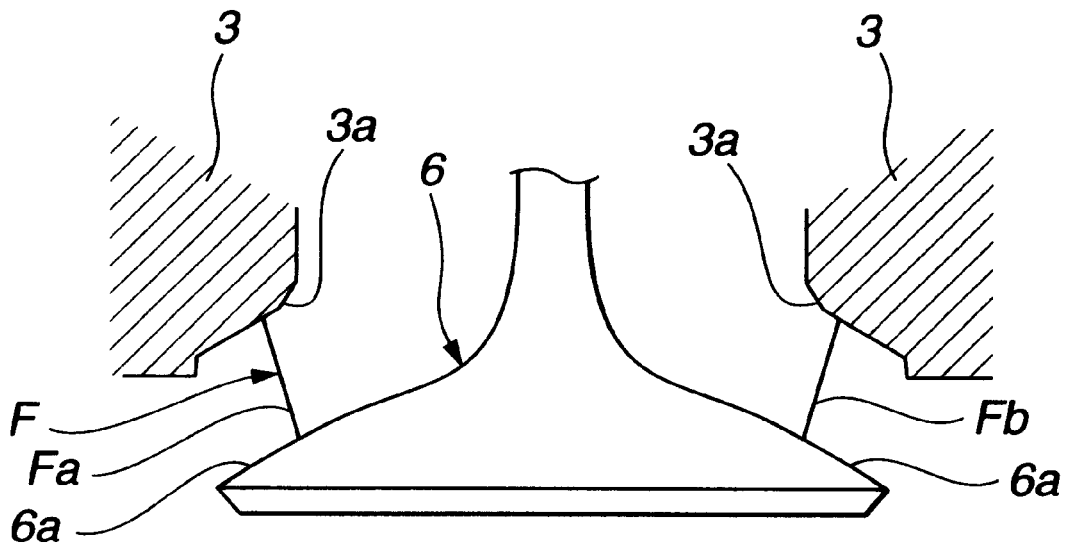
FIG. 10A is an explanatory sectional view showing a locational relationship between an intake valve and a valve seat, explaining an opening area of the intake valve.
Figure 10B:
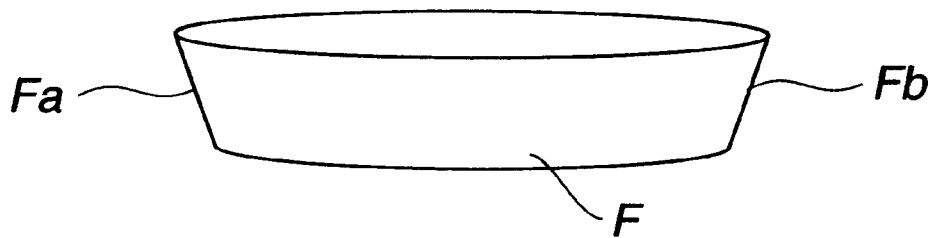
FIG. 10B is a perspective representation of an imaginary generally frustoconical face representing the opening area in connection with FIG. 10B.

In this embodiment, air intake to the cylinder is accomplished twice in the intake stroke in such a manner that an opening area of the intake valve 6 in the second air intake (or the second opening and closing action of the intake valve) becomes larger than that in the first air intake (or the first opening and closing action), i.e., the valve lift (amount) in the second air intake becomes larger than that in the first air intake. As shown in FIGS. 10A 10B, the opening area is an area of an imaginary generally frustoconical face F which imaginarily lies between a valve face 6a of the opened intake valve 6 (at the maximum valve lift) and a valve seat 3a fixed to the cylinder head 3 and located at such a position as to connect the shortest distance between the valve face 6a and the valve 3a. In other words, straight lines Fa, Fb corresponding to the generally frustoconical face F on a cross-sectional plane shown in FIG. 10A connect the valve seat 3a and the valve seat 3a at the shortest distance.

More specifically, in this embodiment, the engine control unit 11 is arranged to control operation of the actuator 12 in such a manner that the valve lift (amount) in the second air intake is about two times of that in the first air intake. The reasons for such control will be discussed with reference to FIG. 5 which depicts the relationship (or so-called valve lift sensitivity) between the amount (mass flow) of intake air to be sucked into the cylinder and the valve lift (amount) of the intake valve. The mass flow corresponds to a flow amount of intake air per second (kg/sec.) In FIG. 5, a line N1 indicates the valve lift sensitivity of the first air intake, and a line N2 indicates the valve lift sensitivity of the second air intake.

As shown in FIG. 5, in the first air intake (or the first opening and closing action of the intake valve), when the valve lift (amount) of the intake valve is gradually increased, the mass flow takes the maximum valve of W1-1 at the valve lift L1. Thereafter, the mass flow is lowered as the valve lift is increased over L1, so that the mass flow is lowered at L2 and takes the value of W1-2 smaller than the value of W1-1. This reveals that, in the first air intake, an intake air supply effect as same as or over that at a full lift (amount) of the intake valve can be obtained when the valve lift (amount) is L1.

In contrast, in the second air intake (or the second opening and closing action of the intake valve), as shown in FIG. 5, the mass flow takes the value of W2-1 at the valve lift L1, and takes the value of W2-2 when the valve lift is increased to L2. This reveals that, in the second air intake, the amount of intake air to be supplied into the cylinder is generally proportional to the valve lift (amount) of the intake valve.

Accordingly, in the engine of this embodiment, the valve lift sensitivity is taken to its peak value by decreasing the valve lift (amount) of the intake valve in the first air intake. Additionally, the opening area of the intake valve is increased as large as possible by increasing the valve lift of the intake valve in the second air intake. According to this operation, decreasing the valve lift in the first air intake reduces an unnecessary valve lift (amount), thereby lowering an electric power supplied to the electromagnetic actuator and required for actuation of the intake valve.

Subsequently, a third embodiment of the internal combustion engine E according to the present invention will be discussed with reference to FIGS. 6A to 7B. The engine E of this embodiment is similar in construction to that of the second and third embodiments with the exception that a plurality of intake valves 61, 62, 63 and a plurality of exhaust valves 8, 8 are provided for each cylinder (combustion chamber). Also in this embodiment, the total opening area of the intake valves in the second air intake becomes larger than that of the intake valve in the first air intake. This is realized by increasing the number of the intake valves to be opened in the second air intake relative to that of the intake valve(s) to be opened in the first air intake.

Figure 6A:
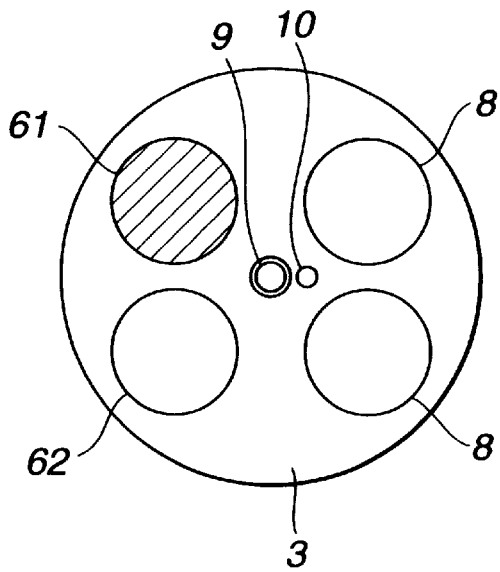
FIG. 6A is an explanatory plan view of a part of an inner wall of a cylinder head defining a combustion chamber, illustrating an operational state of intake valves in an example of a third embodiment of the internal combustion engine (the four valve type) according to the present invention.
Figure 6B:
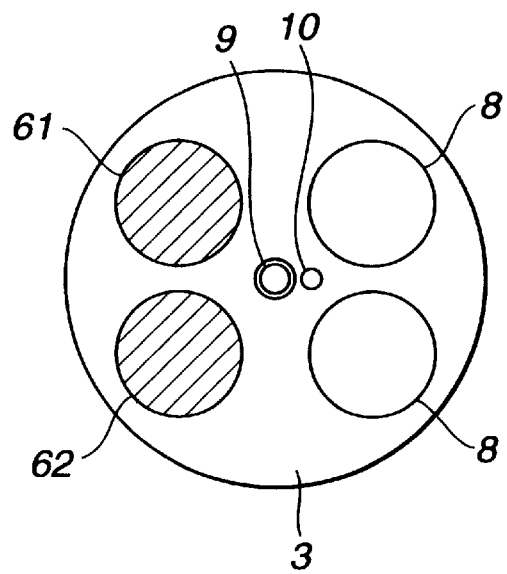
FIG. 6B is an explanatory plan view similar to FIG. 6A but illustrating another operational state of the intake valves of FIG. 6A.

FIGS. 6A and 6B show a part of a four valve type engine E in which two intake valves 61, 62 and two exhaust valves 8, 8 are provided for each cylinder, constituting an example of this embodiment. In this example, one (oblique-lined) 61 of the two intake valves 61, 62 is opened in the first air intake as shown in FIG. 6A while the two intake valves 61, 62 are opened in the second air intake as shown in FIG. 6B. It will be understood that only the intake valves 61 is opened for a time duration corresponding to the above-mentioned first opening and closing action; and the two intake valves 61, 62 are opened for a time duration corresponding to the above-mentioned second opening and closing action.

With the arrangement of this example, in the first air intake (i.e., the first opening and closing action of the intake valve 61) where the valve lift sensitivity is low, one of the two intake valves 61, 62 makes its opening and closing action so as to ensure a necessary intake valve opening area for intake air sucked into the cylinder. Then, all of the two intake valves 61, 62 are opened thereby ensuring the maximum intake valve opening area for intake air. As a result, the principle of the present invention can be effectively realized. In this embodiment, the opening area of the intake valve (2) is a total of the opening area(s) of the opened intake valve(s). The opening area may be a total of the cross-sectional area(s) of the valve head(s) of the opened intake valve(s), the cross-sectional area being on a cross-sectional plane perpendicular to the axis of the intake valve.

Figure 8:
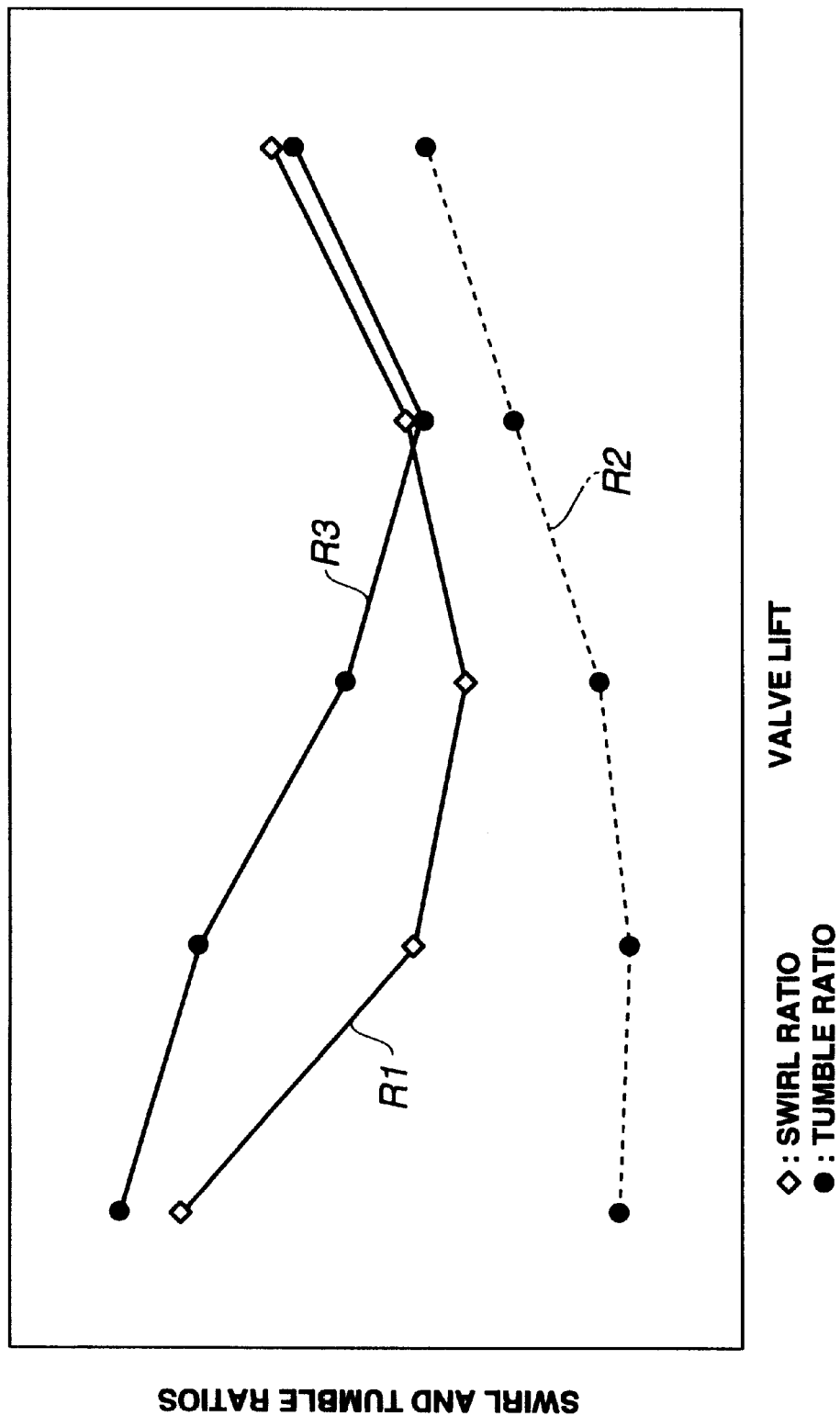
FIG. 8 is a graph showing the relationship between swirl ratio or tumble ratio and valve lift of intake valve, explaining swirl flow generating effect and tumble flow generating effect in the engine of FIGS. 6A and 6B.

By opening one of the two intake valves 61, 62, particularly so-called swirl flow and so-called tumble flow of intake air can be generated in the combustion chamber 4 in the first air intake thereby improving a combustion efficiency of the engine. FIG. 8 depicts effects of generating swirl flow or tumble flow of intake air in terms of swirl ratio or tumble ratio, in cases of engine operation modes in which one or two intake valves are opened. The swirl ratio is represented by [a flow speed (m/sec.) of gas in a tangential direction of the cylinder bore/a flow speed (m/sec.) of gas in an axial direction of the cylinder bore]. The tumble ratio is represented by [a flow speed (m/sec.) of tumble flow of gas in an axial direction of the cylinder bore/a flow speed (m/sec.) of gas in an axial direction of the cylinder bore]. A line R1 represents a variation in swirl ratio in case of an engine operation mode in which only the right-side intake valve 61 is opened in intake stroke. A line R2 represents a variation in tumble ratio in case of an engine operation mode in which the two intake valves 61, 62 are opened in intake stroke. A line R3 represents a variation in tumble ratio in case of an engine operation mode in which only the right-side intake valve 61 is opened in intake stroke. It will be understood that the swirl ratio is about 0 in case of an engine operation mode in which both the intake valves 61, 62 are closed, and therefore the swirl ratio variation in such a case is not shown in FIG. 8.

As apparent from FIG. 8, the effect of generating swirl flow of intake air is remarkably exhibited in case of the engine operation mode in which one of the two intake valves is opened. Additionally, a remarkable effect of generating tumble flow of intake air is exhibited in case of the engine operation mode in which only one of the two intake valves is opened as compared with the engine operation mode in which both the two intake valves are opened.

Figure 7A:
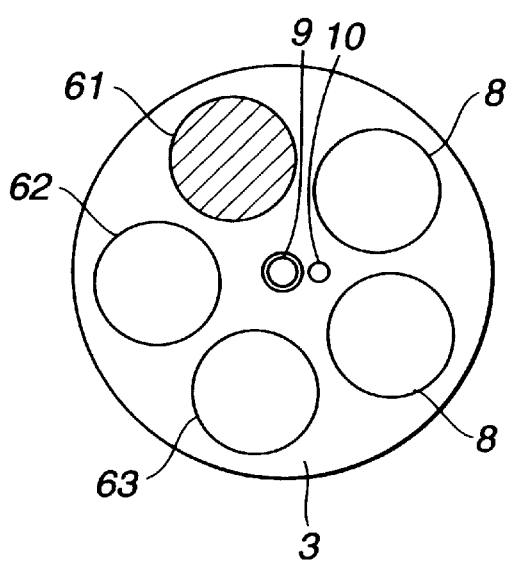
FIG. 7A is an explanatory plan view of a part of an inner wall of a cylinder head defining a combustion chamber, illustrating an operation state of intake valves in another example of the third embodiment of the internal combustion engine (the five valve type) according to the present invention.
Figure 7B:
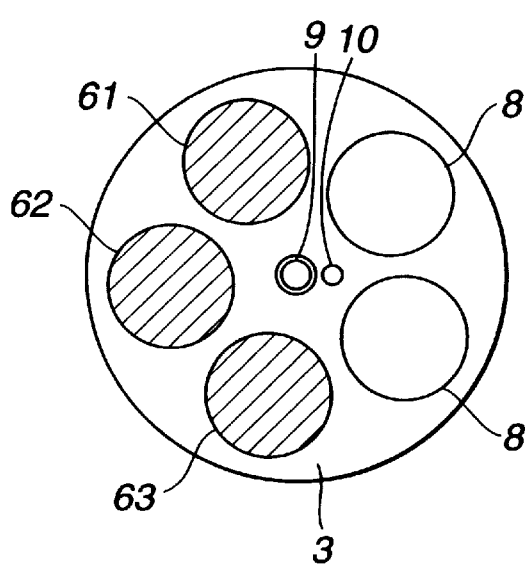
FIG. 7B is an explanatory plan view similar to FIG. 7A but illustrating another operation state of the intake valves of FIG. 7A.

FIGS. 7A and 7B show a part of a five valve type engine in which three intake valves 61, 62, 63 and two exhaust valves 8, 8 are provided for each cylinder, constituting another example of this embodiment. In this example, one (oblique-lined) 61 of the three intake valves 61, 62, 63 is opened in the first air intake as shown in FIG. 7A while the three intake valves 61, 62, 63 are opened in the second air intake as shown in FIG. 7B. It will be understood that the same effects as those in the example of FIGS. 6A and 6B can be obtained. In this five valve type engine, the intake valves 61, 62 or the intake valves 61, 63 may be opened in the first air intake, while all the three intake valves 61, 62, 63 may be opened in the second air intake.

Figure 9:
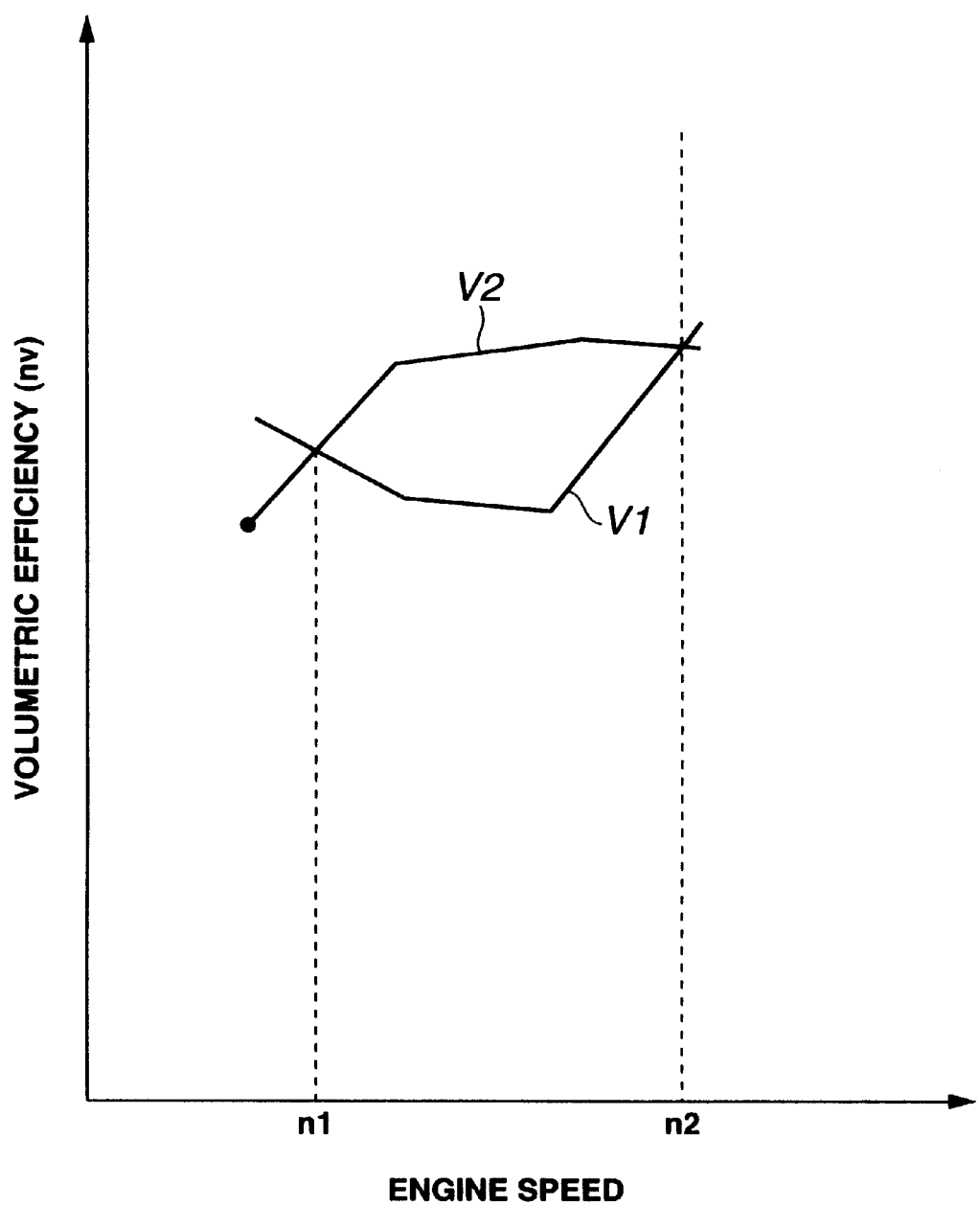
FIG. 9 is a graph showing the relationship between volumetric efficiency and engine speed, explaining effects of a fourth embodiment of the internal combustion engine according to the present invention.

Next, a fourth embodiment of the internal combustion engine E according to the present invention will be discussed with reference to FIG. 9. The engine E of this embodiment is the same in construction as that of the first embodiment but slightly different in control for the intake valve 6. That is, in this embodiment, the first and second air intakes (made also in the first and second embodiments) made only in a predetermined low engine speed range of the engine E. FIG. 9 depicts comparison in volumetric efficiency ($\eta v$) made between the engine operation mode (indicated by a line V1) carrying out only one air intake in intake stroke and the engine operation mode (indicated by a line V2) carrying out the first and second air intakes in intake stroke. In a low engine speed range lower than a first predetermined engine speed n1, the volumetric efficiency is higher in the former engine operation mode. However, in an engine speed range between the first predetermined engine speed n1 and a second predetermined engine speed n2, the volumetric efficiency is higher in the latter engine operation mode than in the former engine operation mode. In an engine speed range over the second predetermined engine speed n2, the volumetric efficiency is higher in the former engine operation mode than in the latter engine operation mode.

In this regard, according to this embodiment, the first and second air intakes in intake stroke are carried out only in the predetermined engine speed range between the first and second predetermined engine speeds n1, n2. Only one air intake in intake stroke is carried out in the engine speed ranges lower than the first predetermined engine speed n1 and higher than the second predetermined engine speed n2. Thus, control manners of the intake valves are changed in accordance with engine speed. The first predetermined engine speed n1 is about 1000 r.p.m. while the second predetermined engine speed n2 is about 2500 r.p.m.

Thus, according to this embodiment, the engine operation mode carrying out the only one air intake and the engine operation mode carrying out the first and second air intakes are changed over in accordance with engine speed of the engine E, thereby effectively improving the volumetric efficiency of the engine E.

While the control manners of the intake valve of the fourth embodiment have been applied to the engine of the first embodiment, it will be understood that the same control manners of the intake valve(s) may be applied to the engines of the second and third embodiments.

As appreciated from the above, according to the present invention, the intake valve(s) is electromagnetically operated to make two (first and second) opening and closing actions in an intake stroke in synchronism with intake air pulsation. The first opening and closing action of the intake valve amplitudes the intake air pulsation thereby increasing the pressure differential between the inside and the outside of the combustion chamber. Then, air intake into the combustion chamber can be effectively accomplished by the second opening and closing action of the intake valve under the effect of the pressure differential. As a result, the volumetric efficiency of the engine can be largely improved without applying a structural change to a conventional internal combustion engine while avoiding making the engine large-sized. This can also improve the combustion efficiency of the engine.

The entire contents of Japanese Patent Application P11-180453 (filed Jun. 25, 1999) are incorporated herein by reference.

Although the invention has been described above by reference to certain embodiments of the invention, the invention is not limited to the embodiments described above. Modifications and variations of the embodiments described above will occur to those skilled in the art, in light of the above teachings. The scope of the invention is defined with reference to the following claims.

What is claimed is:

1. An internal combustion engine comprising:

an intake valve;

an electromagnetic actuator for actuating said intake valve so that the intake valve makes its opening and closing action; and a control unit for controlling the electromagnetic actuator in accordance with engine operating conditions, said control unit being arranged to control said electromagnetic actuator in a manner to cause the intake valve to make first and second opening and closing actions in an intake stroke in synchronism with intake air pulsation, said first opening and closing action being before in time the second opening and closing action.

2. An internal combustion engine as claimed in claim 1, wherein said control unit is arranged to control said electromagnetic actuator in a manner to cause said intake valve in the second opening and closing action to have an opening area larger than that of said intake valve in the first opening and closing action.

3. An internal combustion engine as claimed in claim 1, wherein said control unit is arranged to control said electromagnetic actuator in a manner to cause said intake valve in the second opening and closing action to have an amount of valve lift larger than that of said intake valve in the first opening and closing action.

4. An internal combustion engine as claimed in claim 1, wherein said control unit is arranged to control said electromagnetic actuator in a manner to cause the first and second opening and closing actions to be made in the intake stroke only in a predetermined low engine speed range of the engine.

5. An internal combustion engine as claimed in claim 1, further comprising at least one intake valve in addition to said intake valve for each cylinder, wherein at least one intake valve is operated to make its opening and closing action in a first time duration, and at least one intake valve is operated to make its opening and closing action in a second time duration, the first time duration being before the second time duration, wherein said control unit is arranged to control said electromagnetic actuator in a manner to cause the number of said intake valve operated in the second time duration to be larger than that of said intake valve operated at the first time duration.

6. An internal combustion engine as claimed in claim 5, wherein said control unit is arranged to control said electromagnetic actuator in a manner to cause the first and second opening and closing actions to be made in the intake stroke only in a predetermined low engine speed range of the engine.

* * * * *